(12) United States Patent
Chiba (10) Patent No.: US 11,526,307 B2
(45) Date of Patent: Dec. 13, 2022

(54) IMAGE PROCESSING APPARATUS, METHOD FOR CONTROLLING IMAGE PROCESSING APPARATUS, AND STORAGE MEDIUM FOR DISPLAYING AN OBJECT FOR EXECUTING ONE OR MORE PRINT JOBS

(71) Applicant: CANON KABUSHIKI KAISHA, Tokyo (JP)

(72) Inventor: Shinichi Chiba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/019,659

(22) Filed: Sep. 14, 2020

(65) Prior Publication Data
US 2021/0089245 A1    Mar. 25, 2021

(30) Foreign Application Priority Data
Sep. 20, 2019    (JP) .............................. JP2019-171677

(51) Int. Cl.
*G06F 3/12*    (2006.01)

(52) U.S. Cl.
CPC .......... *G06F 3/1204* (2013.01); *G06F 3/1238* (2013.01); *G06F 3/1254* (2013.01)

(58) Field of Classification Search
None
See application file for complete search history.

(56) References Cited

U.S. PATENT DOCUMENTS

2003/0093670 A1* 5/2003 Matsubayashi ....... G06F 21/608
                                                                      713/168

FOREIGN PATENT DOCUMENTS

JP       2017-024261 A       2/2017
WO    WO-2009104514 A1 *  8/2009 ............. G03G 15/50

* cited by examiner

*Primary Examiner* — Thomas D Lee
(74) *Attorney, Agent, or Firm* — Canon U.S.A., Inc. IP Division (57) ABSTRACT

Embodiments of the disclosure provide a method capable of executing all print jobs stored in an image processing apparatus and associated with a user without troubling the user. A button capable of executing all print jobs associated with a login user is displayed on a display unit of the image processing apparatus.

17 Claims, 13 Drawing Sheets

| JOB ID | USERNAME | JOB NAME | SIZE (kbyte) |
|---|---|---|---|
| job0001 | user001 | siryou1.pptx | 30.5 |
| job0002 | user001 | siryou2.docx | 15.5 |
| job0003 | user001 | siryou3.xlsx | 27 |
| job0004 | user002 | memo1.txt | 2 |
| job0005 | user003 | http://www.xxxxxxx.com | 350 |

IMAGE PROCESSING APPARATUS, METHOD FOR CONTROLLING IMAGE PROCESSING APPARATUS, AND STORAGE MEDIUM FOR DISPLAYING AN OBJECT FOR EXECUTING ONE OR MORE PRINT JOBS

BACKGROUND

Field of the Disclosure

The present disclosure relates to an image processing apparatus, a method for controlling an image processing apparatus, and a storage medium.

Description of the Related Art

Some image processing apparatuses have a function of temporarily storing an accepted print job therein and starting to execute the print job when a user's print instruction is accepted by their operation panel (hereinafter, such printing will be referred to as reservation printing) instead of executing the print job at the timing of reception.

Reservation printing needs operations to open a reservation print application from the operation panel of the image processing apparatus, select a job to be printed from a list of accepted print jobs, and give an instruction to start printing. Japanese Patent Application Laid-Open No. 2017-24261 discusses a technique for omitting such operations. The technique discussed in Japanese Patent Application Laid-Open No. 2017-24261 automatically starts printing a reservation print job associated with a login user without user operations when the user logs in to the image processing apparatus.

If there is a plurality of reservation print jobs and the user wants to execute all the jobs, the user needs to select all of the jobs and give print instructions. Such operations are troublesome to the user. On the other hand, in the configuration that all the reservation print jobs are executed at timing when the user logs in as discussed in Japanese Patent Application Laid-Open No. 2017-24261, if the user wants to execute other processing, processing not intended by the user is performed.

SUMMARY

The present disclosure is directed to providing a method capable of confirming the user's intention before executing all the reservation print jobs without troubling the user. According to embodiments of the present disclosure, an image processing apparatus configured to display an operation screen includes an authentication unit configured to authenticate a user of the image processing apparatus, a determination unit configured to determine whether there is a print job associated with the user authenticated by the authentication unit, and a display control unit configured to control display of a first display object for giving a batch instruction to execute a plurality of print jobs associated with the user on the operation screen displayed after the user is authenticated by the authentication unit, based on a result of the determination made by the determination unit.

Further features of the present disclosure will become apparent from the following description of exemplary embodiments with reference to the attached drawings.

DESCRIPTION OF THE EMBODIMENTS

Exemplary embodiments of the present disclosure will be described below with reference to the drawings. The following exemplary embodiments are not intended to limit the disclosure, and all combinations of features described in the exemplary embodiments are not necessarily deemed to be indispensable.

First Exemplary Embodiment

Figure 1:
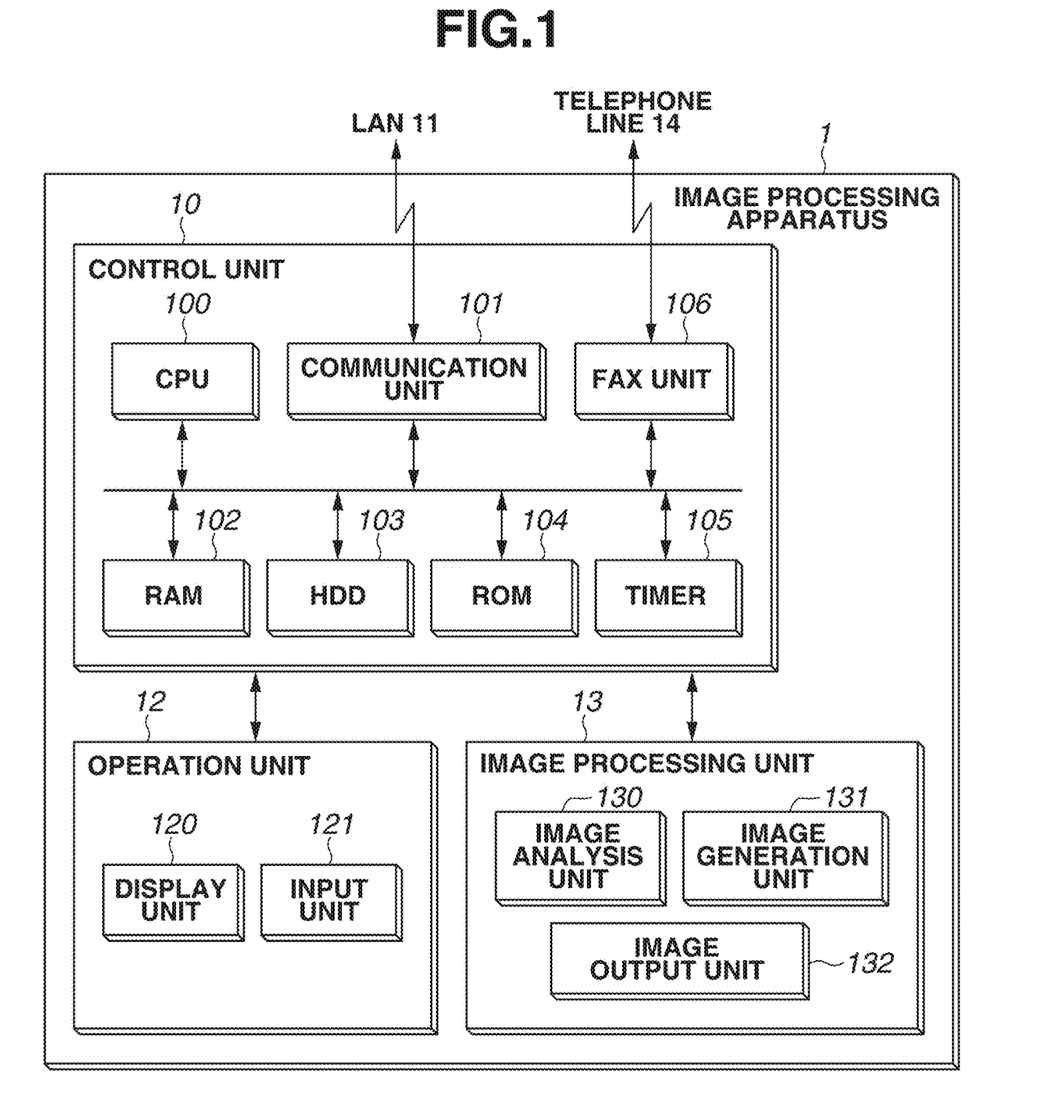
FIG. 1 is a hardware block diagram of image processing apparatuses according to a first exemplary embodiment of the present disclosure.

FIG. 1 is a block diagram illustrating a configuration of an image processing apparatus 1 according to the present exemplary embodiment.

A control unit 10 controls operation of various units of the image processing apparatus 1. The control unit 10 includes a central processing unit (CPU) 100, a local area network (LAN) 11, a communication unit 101, a random access memory (RAM) 102, a hard disk drive (HDD) 103, a read-only memory (ROM) 104, a timer 105, and a facsimile (FAX) unit 106. The CPU 100 controls the entire control unit 10. The LAN 11 is a network for exchanging data with an external apparatus. The image processing apparatus 1 is connected to the Internet via the LAN 11. The communication unit 101 transmits and receives data via the LAN 11. The RAM 102 provides a system work memory for the CPU 100 to operate. The HDD 103 may be a storage medium such as a magnetic disk, an optical medium, and a flash memory. The HDD 103 can store document data and setting data. The HDD 103 does not need to be located inside the image processing apparatus 1. An external server or personal computer (PC) may be used as a data storage device via the communication unit 101. The ROM 104 is a boot ROM and stores a system boot program. Using the system boot program in the ROM 104, the CPU 100 loads a program installed in the HDD 103 into the RAM 102 and performs various controls based on the program. The timer 105 clocks time based on instructions from the CPU 100. If a specified time has elapsed, the timer 105 notifies the CPU 100 that a specified time has elapsed by an interrupt. The FAX unit 106 transmits and receives FAX data through a telephone line 14.

An operation unit 12 is controlled by the control unit 10, and includes a display unit 120 and an input unit 121. The display unit 120 is a display for displaying information about the image processing apparatus 1 to a user. The input unit 121 accepts operation inputs from the user via an interface such as a touch panel, a mouse, a camera, voice input, and a keyboard.

An image processing unit 13 is controlled by the control unit 10, and includes an image analysis unit 130, an image generation unit 131, and an image output unit 132. The image analysis unit 130 analyzes the structure of an original image and extracts necessary information from the analysis result. The image generation unit 131 digitizes the image of an original to generate image data by reading (for example, scanning) the original, and stores the image data in the HDD 103. The image generation unit 131 can also generate original image data in a different format by using the information extracted by the image analysis unit 130. The image output unit 132 outputs the image data stored in the HDD 103. Examples of the output method include printing original image data on a sheet, transmitting original image data to a network-connected external device, server, or facsimile via the communication unit 101 or the FAX unit 106, and storing original image data in a storage medium connected to the image processing apparatus 1.

Figure 2:
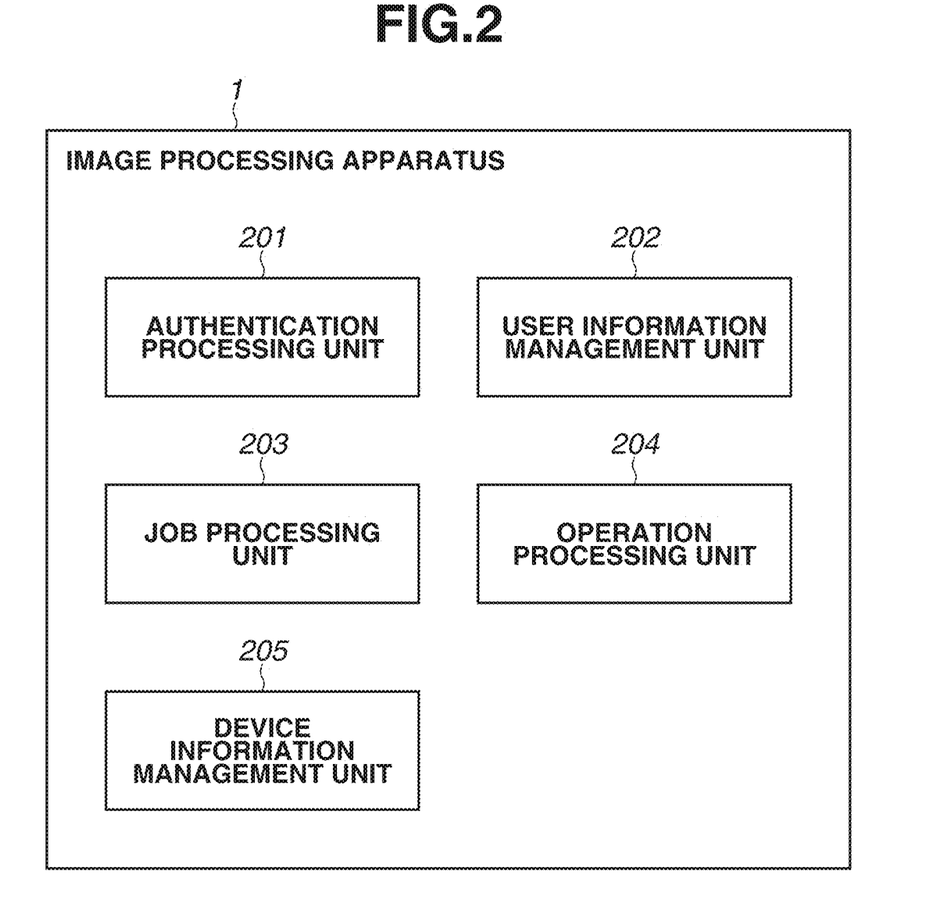
FIG. 2 is a software block diagram of the image processing apparatus according to the first exemplary embodiment of the present disclosure.

FIG. 2 is a block diagram illustrating examples of functions of the image processing apparatus 1 illustrated in FIG. 1. The image processing apparatus 1 includes an authentication processing unit 201, a user information management unit 202, a job processing unit 203, an operation processing unit 204, and a device information management unit 205 as functional units. These functional units represent functions implemented by the CPU 100 loading programs installed in the HDD 103 into the RAM 102 and executing the programs based on the system boot program in the ROM 104.

The authentication processing unit 201 performs processing for accepting login and logout requests from a user, performing authentication, and identifying the user who uses the image processing apparatus 1.

The user information management unit 202 manages information about the user identified by the authentication processing unit 201. For example, the user information management unit 202 can manage use languages (such as English and Japanese) to be used user by user and switch the use language based on the login user. The user information management unit 202 can also manage print jobs received from external apparatuses via the communication unit 101 for each user who has submitted a job or jobs.

The job processing unit 203 processes various jobs executed in the image processing apparatus 1. Specifically, the job processing unit 203 controls the image generation unit 131 to execute a scan job, controls the image output unit 132 to execute a print job, and controls the communication unit 101 to execute a transmission job.

The operation processing unit 204 controls the display unit 120 to display various types of information to the user. The operation processing unit 204 also receives the user's operation instructions input from the input unit 121 and processes the operation instructions.

The device information management unit 205 manages information about the entire image processing apparatus 1. Specific examples of the information include an Internet Protocol (IP) address assigned to the image processing apparatus 1, and setting values common to all users who use the image processing apparatus 1. The device information management unit 205 can also manage similar types of information to those managed by the user information management unit 202. For example, if the common setting of the use language is English, the device information management unit 205 presents messages in English to a user who uses the image processing apparatus 1 without making a use language setting in particular. If a user sets Japanese as the use language, messages can be presented to the user in Japanese.

Figure 3:
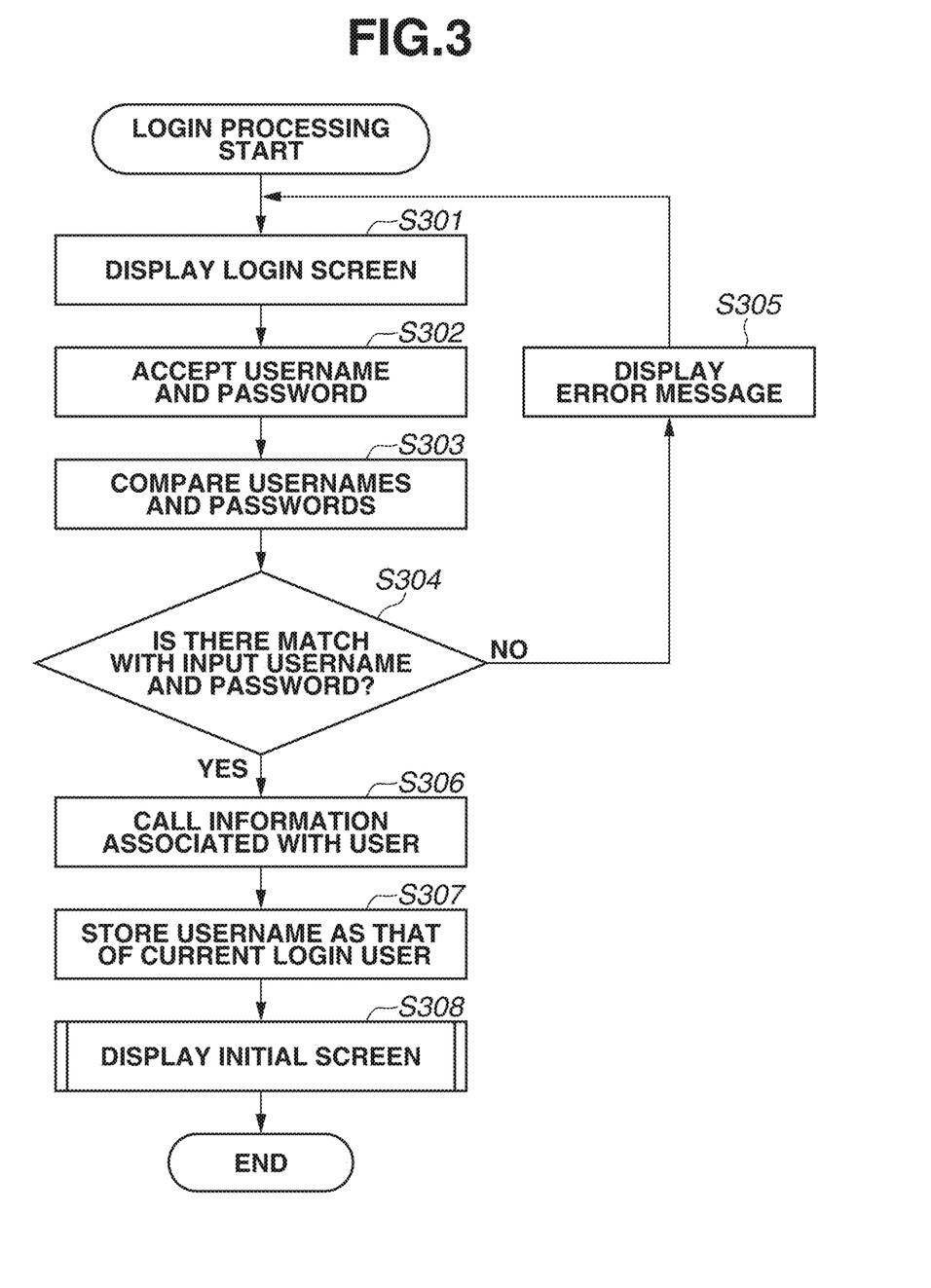
FIG. 3 is a flowchart illustrating a method for logging in to the image processing apparatus according to the first exemplary embodiment of the present disclosure.

Next, processing from activation of the image processing apparatus 1 to display of a screen for a login user will be described with reference to the flowchart of FIG. 3. The flowchart of FIG. 3 is implemented by the authentication processing unit 201, the user information management unit 202, the job processing unit 203, the operation processing unit 204, and the device information management unit 205. In the present exemplary embodiment, "login" refers to user authentication made by the image processing apparatus 1 according to the method described below.

In step S301, the authentication processing unit 201 determines whether there is a login request. The display unit 120 displays a login screen (FIG. 4) and a user inputs an identifier (ID) and a password via the input unit 121, whereby a login request is made.

Figure 4:
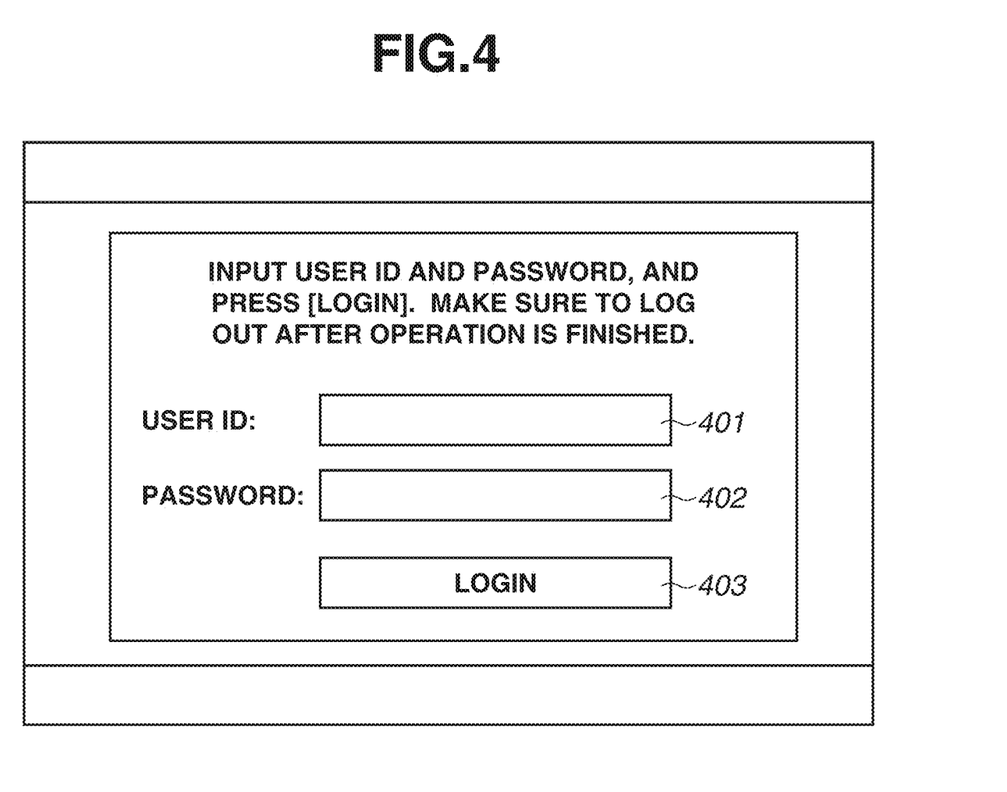
FIG. 4 is a diagram illustrating the method for logging in to the image processing apparatus according to the first exemplary embodiment of the present disclosure.

FIG. 4 illustrates an example of the login screen displayed on the display unit 120. The user issues a login request by inputting a login user ID into a user ID input field 401 and a password into a password input field 402, and pressing a login key 403. In step S302, the authentication processing unit 201 accepts the user ID (hereinafter, referred to as a username) and the password. A login request may be made based on input from an integrated circuit (IC) card reading device or a biometric authentication device, such as a fingerprint authentication device, connected to the input unit 121 of the image processing apparatus 1. In step S303, the authentication processing unit 201 receiving the login request compares usernames and passwords stored in the HDD 103 with the input username and password for a match. In step S304, if the authentication processing unit 201 determines that there is no match with the input username and password (NO in step S304), the processing proceeds to step S305. In step S305, the authentication processing unit 201 displays an error message on the display unit 120 via the operation processing unit 204 for a certain period of time, and the processing returns to step S301. In step S301, the authentication processing unit 201 displays the login screen on the display unit 120 via the operation processing unit 204.

If, in step S304, the authentication processing unit 201 determines that there is a match with the input username and password (YES in step S304), the processing proceeds to step S306. In step S306, the user information management unit 202 calls information stored in the HDD 103 and associated with the user.

In step S307, the user information management unit 202 stores the username of the user successfully authenticated in step S304 as a username of the current login user.

In step S308, the operation processing unit 204 displays an initial screen upon which the called information about the login user is reflected on the display unit 120. In the present exemplary embodiment, the initial screen refers to a screen presented to the user immediately after login to the image processing apparatus 1. Examples of screens that can be set as the initial screen include various application screens including an application screen of a copy application capable of setting a copy job, and a menu screen where buttons capable of executing various applications are arranged (hereinafter, referred to as a home screen). Which screen to display as the initial screen can be set in advance by the user or an administrator of the image processing apparatus 1.

Figure 5:
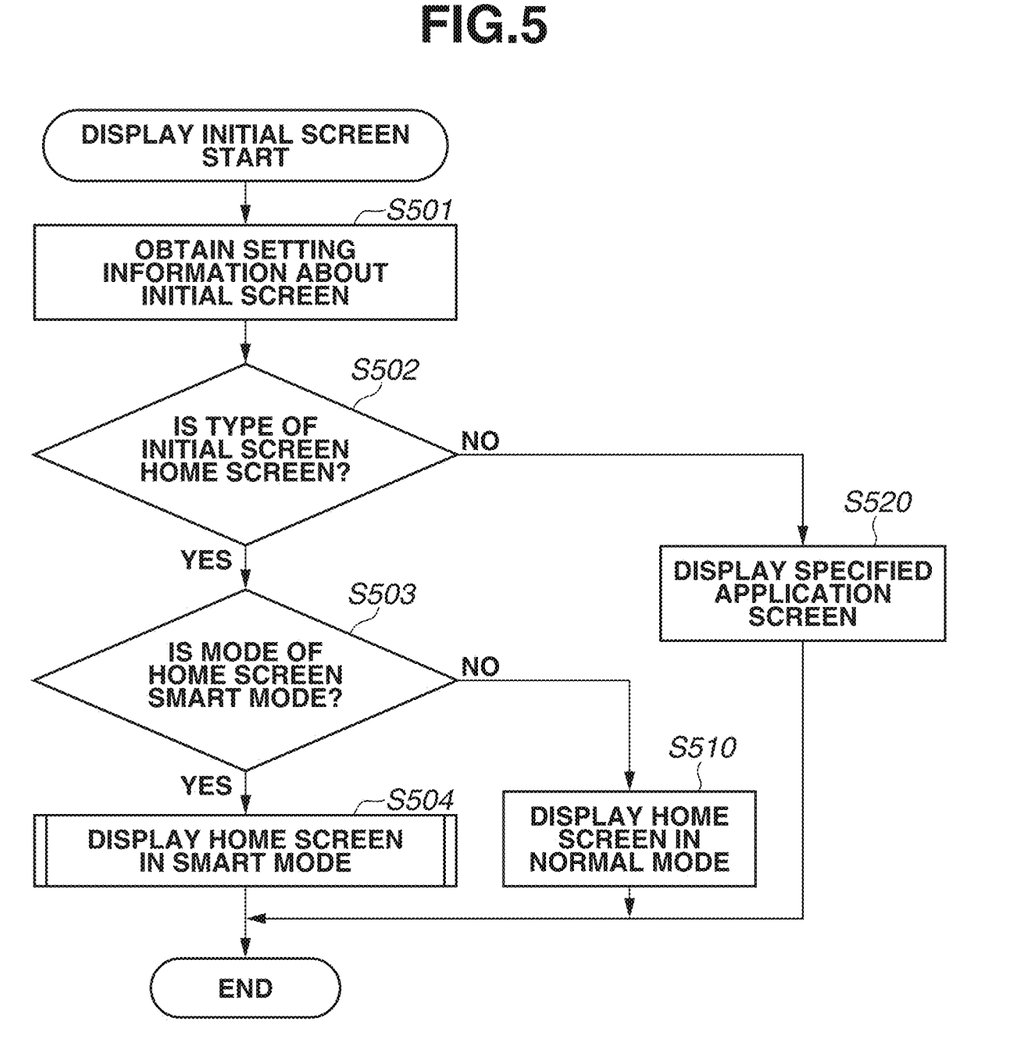
FIG. 5 is a flowchart illustrating a method for controlling an initial screen according to the first exemplary embodiment of the present disclosure.

Next, details of the display of the initial screen in step S308 will be described with reference to the flowchart of FIG. 5. The flowchart of FIG. 5 is implemented by the authentication processing unit 201, the user information management unit 202, the job processing unit 203, the operation processing unit 204, and the device information management unit 205.

In step S501, the operation processing unit 204 obtains information (setting information) about the initial screen from the user information management unit 202 and the device information management unit 205, and determines the contents of the initial screen to be presented to the login user. Specifically, if setting information about the initial screen specific to the login user is set in advance in the user information management unit 202, the operation processing unit 204 uses the setting information. If not, the operation processing unit 204 uses setting information about an initial screen, stored as default information in the device information management unit 205.

In step S502, the operation processing unit 204 determines the type of initial screen based on the setting information about the initial screen obtained in step S501.

Figure 6:
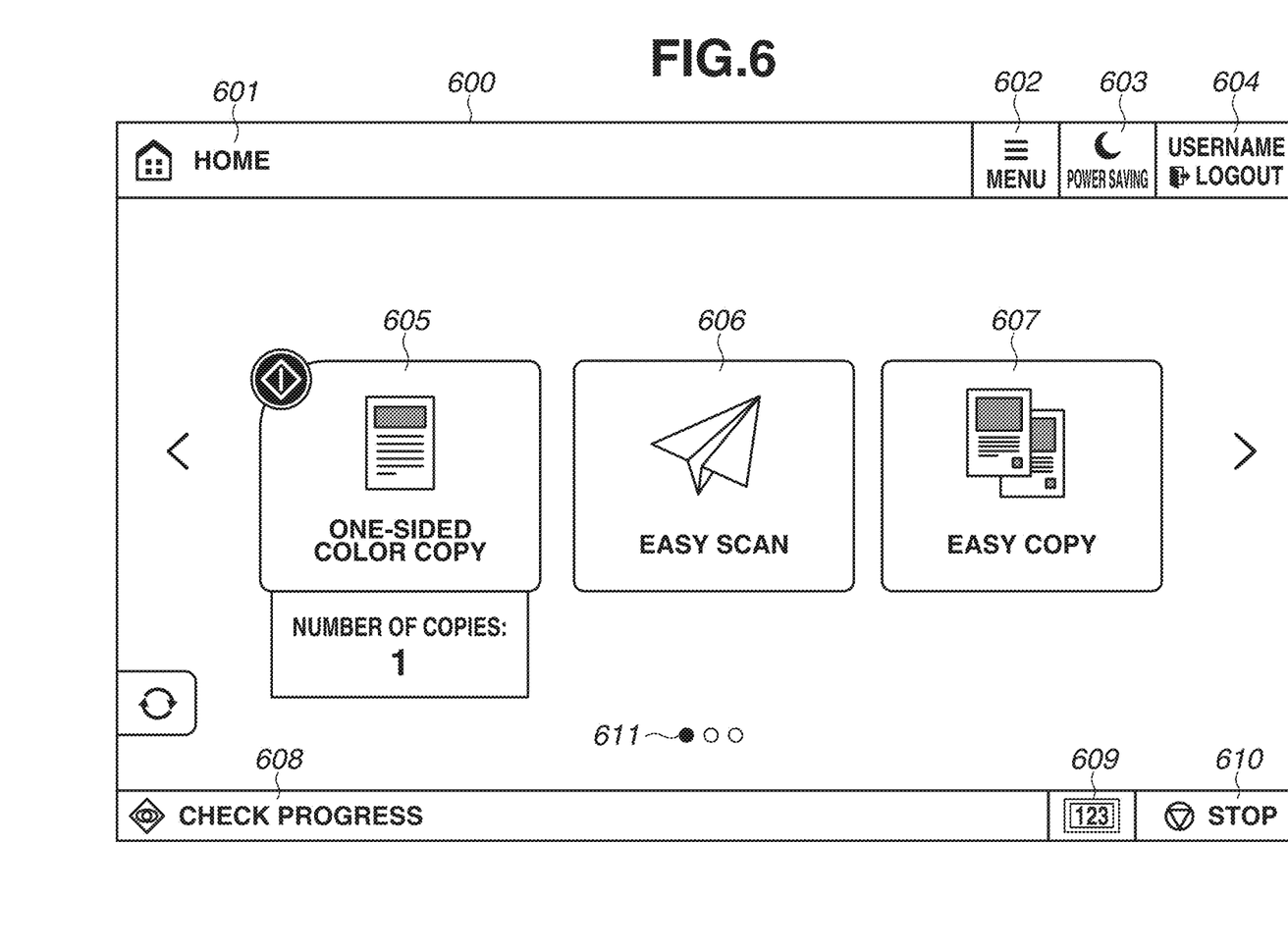
FIG. 6 is a diagram illustrating a home screen immediately after login according to the first exemplary embodiment of the present disclosure.

If the type of initial screen determined in step S502 is an application screen such as that of a copy application (NO in step S502), the processing proceeds to step S520. In step S520, the operation processing unit 204 displays the application screen specified as the initial screen on the display unit 120 as the initial screen. The processing is ended. If the type of initial screen determined in step S502 is a home screen (YES in step S502), the processing proceeds to step S503. In step S503, the operation processing unit 204 determines the mode of the home screen. If the mode determined in step S503 is a smart mode (YES in step S503), the processing proceeds to step S504. In step S504, the operation processing unit 204 displays the home screen in the smart mode (FIG. 6). The processing is ended. If the mode determined in step S503 is a normal mode (NO in step S503), the processing proceeds to step S510. In step S510, the operation processing unit 204 displays the home screen in the normal mode. The home screen in the smart mode refers to one in a mode where, unlike the home screen in the conventional normal mode, the order of arrangement of the buttons displayed on the home screen is dynamically changed based on user operations and the state of the image processing apparatus 1. The home screen in the normal mode is a static home screen where the order of arrangement of the buttons is not dynamically changed.

FIG. 6 illustrates an example of the home screen displayed on the display unit 120 after a user login according to the first exemplary embodiment.

A home screen 600 is a screen displayed immediately after a user logs in to the image processing apparatus 1. A home notification area 601 is an area for notifying the user that the currently displayed screen is a home screen. A menu button 602 is a button for making settings related to a plurality of functions of the image processing apparatus 1. A power saving button 603 is a button for shifting the image processing apparatus 1 to a power saving state. A username notification area/button 604 is an area displaying the username of the user currently logging in to the image processing apparatus 1 and, if pressed, serves as a button for logging out. Application buttons 605 to 607 are buttons for calling the screens of or giving execution instructions to respective applications. In the first exemplary embodiment, if the application button 605 is pressed, a copy job is executed based on settings "one-sided", "color", and "number of copies: 1". The "number of copies: 1" displayed below the application button 605 indicates the number of copies to be made. If the application button 606 is pressed, a setting screen for executing a scan function is called. If the application button 607 is pressed, a setting screen for executing a copy function is called. A progress check button 608 is a button for entering a screen for checking the progress of various jobs at present. A counter check button 609 is a button for entering a screen for checking the total number of sheets printed by print jobs. A stop button 610 is a button for entering a screen for cancelling the job currently being executed. A home screen number indication section 611 indicates the current page position of the home screen 600. In the example of FIG. 6, the home screen 600 includes a total of three pages of screens, and the home screen number indication section 611 indicates that the first page of the screens is currently displayed. The second and third pages of the screens also include buttons for activating applications. The previous or next page of the screens is displayed based on the user's input operations (for example, flick operation).

Figure 7:
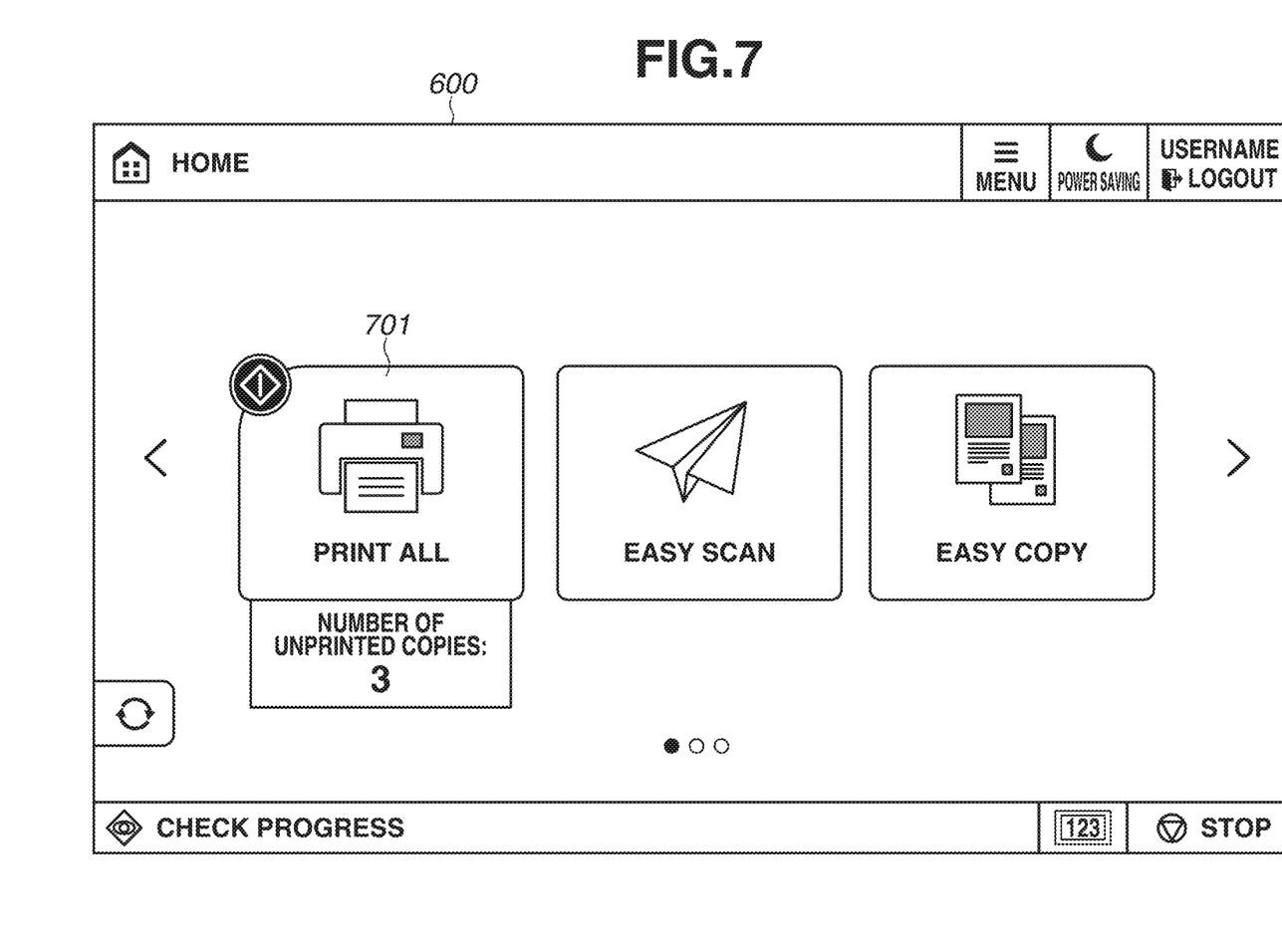
FIG. 7 is a diagram illustrating a home screen immediately after login according to the first exemplary embodiment of the present disclosure.

FIG. 7 illustrates the home screen 600 displayed upon login in a case where any print job associated with the login user is stored (reserved) in the image processing apparatus 1 according to the present exemplary embodiment. This screen will be described with reference to a job information management table 1300 illustrated in FIG. 13. The job information management table 1300 is a table for managing information about jobs stored in the HDD 103 of the image processing apparatus 1 and usernames associated with the jobs. The job information management table 1300 manages the information about print jobs transmitted from outside via the LAN 11 in association with user information.

Figure 13:
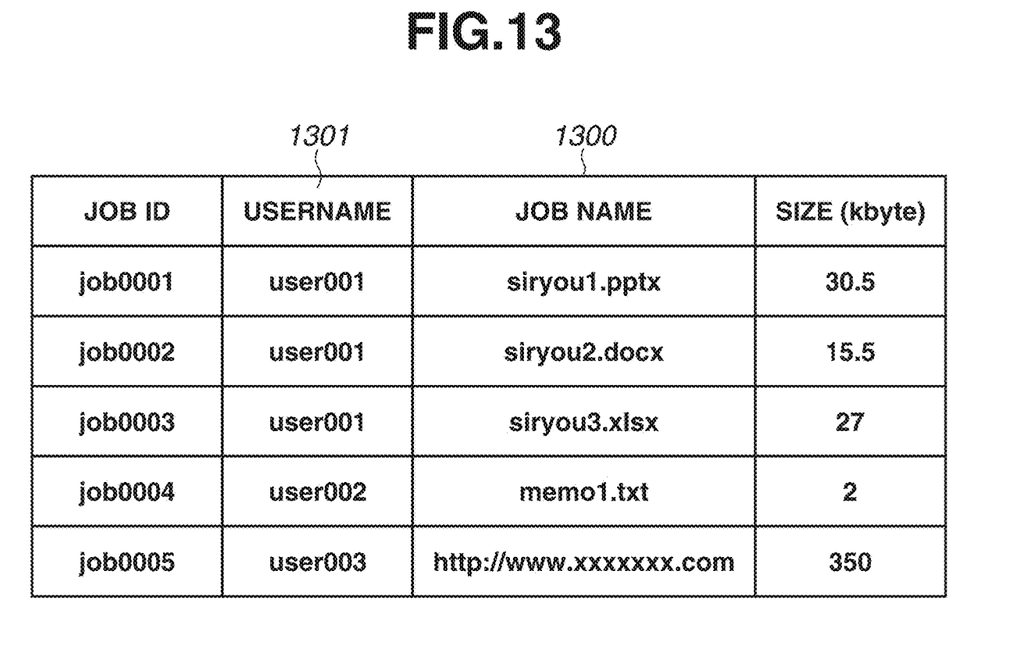
FIG. 13 is a diagram illustrating a job information management table for managing jobs reserved by the image processing apparatus according to the first exemplary embodiment of the present disclosure.

If a user logs in, the image processing apparatus 1 refers to a username 1301 of the job information management table 1300 in FIG. 13, and determines whether there is a job corresponding to the username of the login user. If the image processing apparatus 1 determines that there is one or more print jobs associated with the user, a print all button 701 is generated at the top of the buttons displayed in the home screen 600 (left end of the first home screen). While the print all button 701 is described to be generated here, this is not restrictive. If the print all button 701 has been generated before, the print all button 701 may simply be moved to the top in the display order of the buttons. If the print all button 701 is pressed, all the print jobs associated with the login user (in the first exemplary embodiment, the username of the login user is "user001", and thus three print jobs having job IDs "job0001" to "job0003" associated with "user001" apply) are executed. While the print jobs here are described to be executed immediately after the print all button 701 is pressed, this is not restrictive. For example, if the print all button 701 is pressed, a print execution confirmation screen may be displayed with all the print jobs selected.

Figure 8:
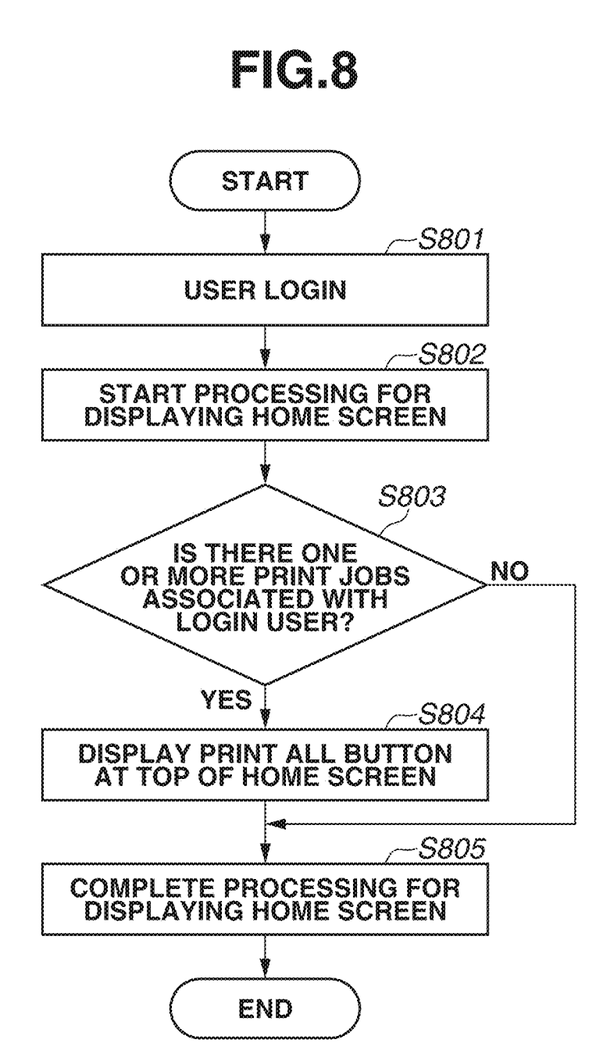
FIG. 8 is a flowchart illustrating a control method related to display of the home screen immediately after login according to the first exemplary embodiment of the present disclosure.

FIG. 8 is a flowchart illustrating a control method related to display of the home screen 600 after login according to the present exemplary embodiment. The processing illustrated in FIG. 8 is implemented, for example, by the CPU 100 executing a program read from the ROM 104.

In step S801, the user logs in. In step S802, the operation processing unit 204 starts processing for displaying the home screen 600. In step S803, the operation processing unit 204 refers to the job information management table 1300 and determines whether there is one or more print jobs associated with the login user. If there is a print job or jobs associated with the login user (YES in step S803), the processing proceeds to step S804. In step S804, the operation processing unit 204 displays a button for executing all the print jobs associated with the login user (print all button 701) at the top of the home screen 600. FIG. 7 illustrates a display example of the print all button 701. The print all button 701 is displayed at the top of the buttons displayed in the home screen 600, and the number of print jobs to be executed is displayed in the area below the print all button 701. If the job information management table 1300 is updated due to addition or execution of a print job, the number of print jobs displayed is also updated. In step S805, the operation processing unit 204 completes the processing for displaying the home screen 600. If, in step S803, there is no print job associated with the login user (NO in step S803), the processing proceeds to step S805. In such a case, the home screen 600 is displayed so that the buttons are arranged in order set by the user in advance or in default order. If, in step S803, there is a print job or jobs associated with the login user, the home screen 600 is displayed in order such that the print all button 701 is displayed at the top.

In the present exemplary embodiment, the button for executing all the print jobs associated with the login user is described to be displayed at the top of the home screen 600. However, this is not restrictive. Only the button for executing all the print jobs associated with the login user may be generated. The effect of the flowchart of FIG. 8 will be described. When the user logs in to the image processing apparatus 1, the button for executing all the print jobs associated with the user is displayed. The user can thus execute all the print jobs associated with the user by simply pressing the button.

Second Exemplary Embodiment

In the first exemplary embodiment, the button for executing all the print jobs has been described to be displayed at the top of the home screen. However, the user does not necessarily want to execute all the print jobs. In the present exemplary embodiment, an example will be described where a button for executing only a print job or jobs selected by the user from among the ones associated with the user is displayed next to the print all button. Since the basic configuration of the present exemplary embodiment is similar to that of the first exemplary embodiment, only differences will be described.

Figure 9:
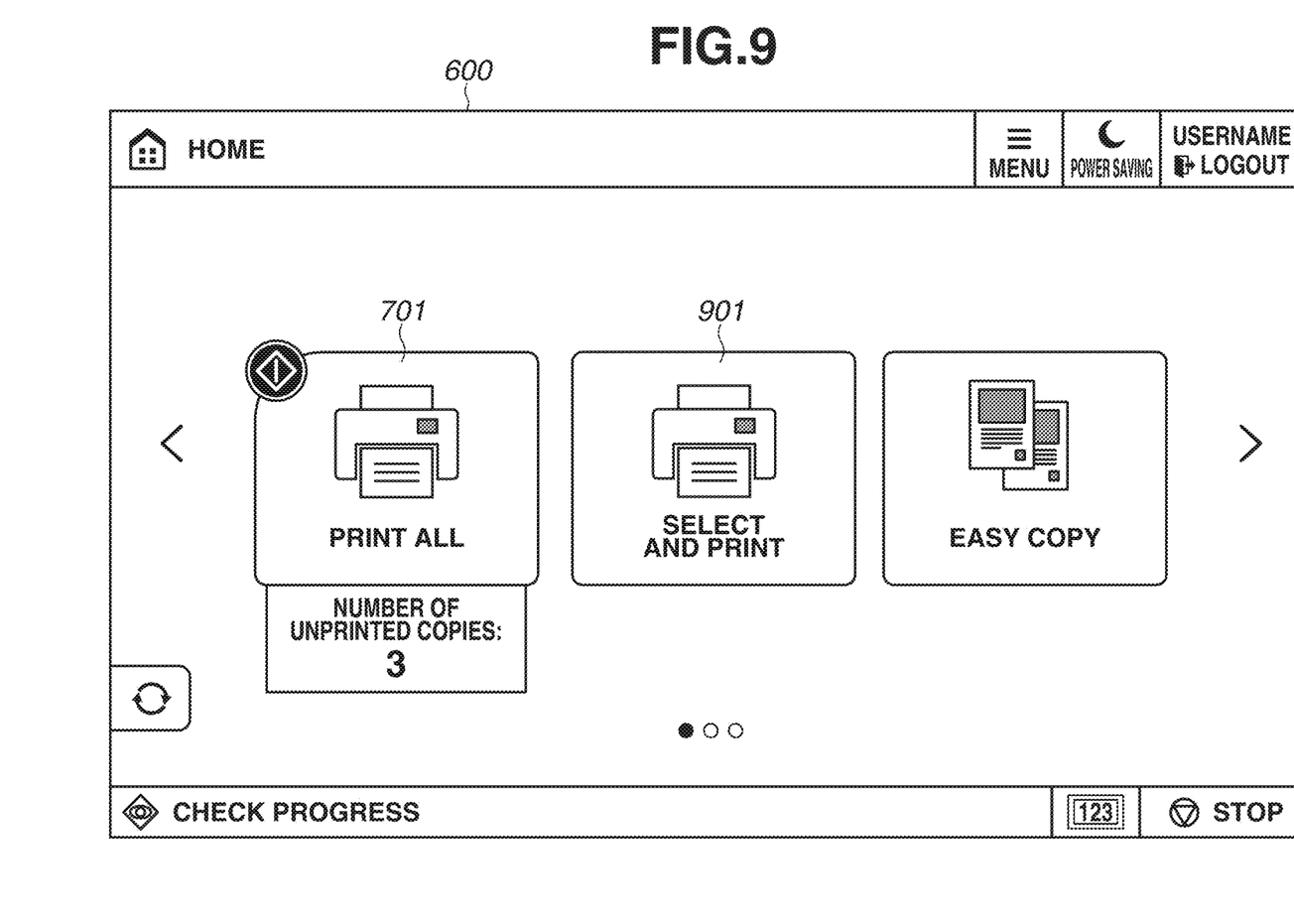
FIG. 9 is a diagram illustrating a home screen immediately after login according to a second exemplary embodiment of the present disclosure.

FIG. 9 illustrates a home screen 600 displayed when there is a print job or jobs associated with the login user according to the present exemplary embodiment.

A print all button 701 is displayed at the top of the home screen 600. A select and print button 901 that is a button for executing only a print job or jobs selected by the user from among the ones associated with the user is displayed next to the print all button 701. If the select and print button 901 is pressed, the operation processing unit 204 displays a screen for listing the print jobs associated with the user and accepting the user's instructions for selecting print jobs. If the user's selection is accepted and then an execution instruction is given, the job processing unit 203 executes only the selected print job or jobs.

Figure 10:
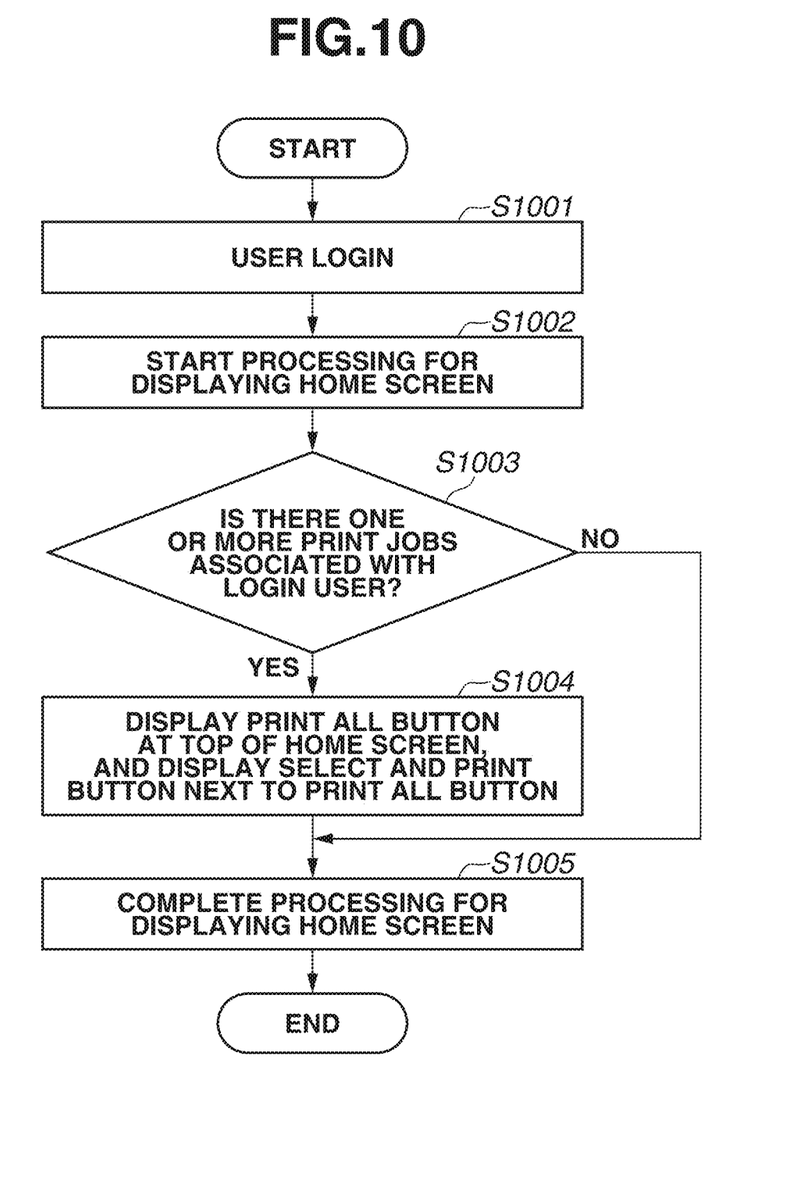
FIG. 10 is a flowchart illustrating a control method related to display of the home screen immediately after login according to the second exemplary embodiment of the present disclosure.

FIG. 10 is a flowchart illustrating a control method related to the display of the home screen 600 after login according to the present exemplary embodiment. The processing illustrated in FIG. 10 is implemented, for example, by the CPU 100 executing a program read from the ROM 104. In step S1001, the user logs in. In step S1002, the operation processing unit 204 starts processing for displaying the home screen 600. In step S1003, the operation processing unit 204 refers to the job information management table 1300 and determines whether there is one or more print jobs associated with the login user. If there is a print job or jobs associated with the login user (YES in step S1003), the processing proceeds to step S1004. In step S1004, the operation processing unit 204 displays the button for executing all the print jobs associated with the login user (print all button 701) at the top of the home screen 600. The operation processing unit 204 also displays the select and print button 901 for executing only a print job or jobs selected by the user from among the ones associated with the login user next to the print all button 701. In step S1005, the operation processing unit 204 completes the processing for displaying the home screen 600. While the select and print button 901 has been described to be displayed next to the print all button 701, the display position of the select and print button 901 is not limited to the position beside the print all button 701.

According to the second exemplary embodiment, in executing print jobs associated with a user, a user-friendly home screen can be provided by taking into account both the cases where the user wants to execute only one(s) selected from the print jobs and where the user wants to execute all the print jobs.

Third Exemplary Embodiment

The first and second exemplary embodiments have dealt with the generation of a button or buttons for executing print jobs associated with the login user. In the present exemplary embodiment, a method for accepting a predetermined operation and deleting all the print jobs associated with the login user will be described. This method is also effective in a case where the user selects a print job or jobs to execute, executes only the selected print job(s), and then deletes all the remaining print jobs. Since the basic configuration of the present exemplary embodiment is similar to that of the first exemplary embodiment, only differences will be described.

Figure 11:
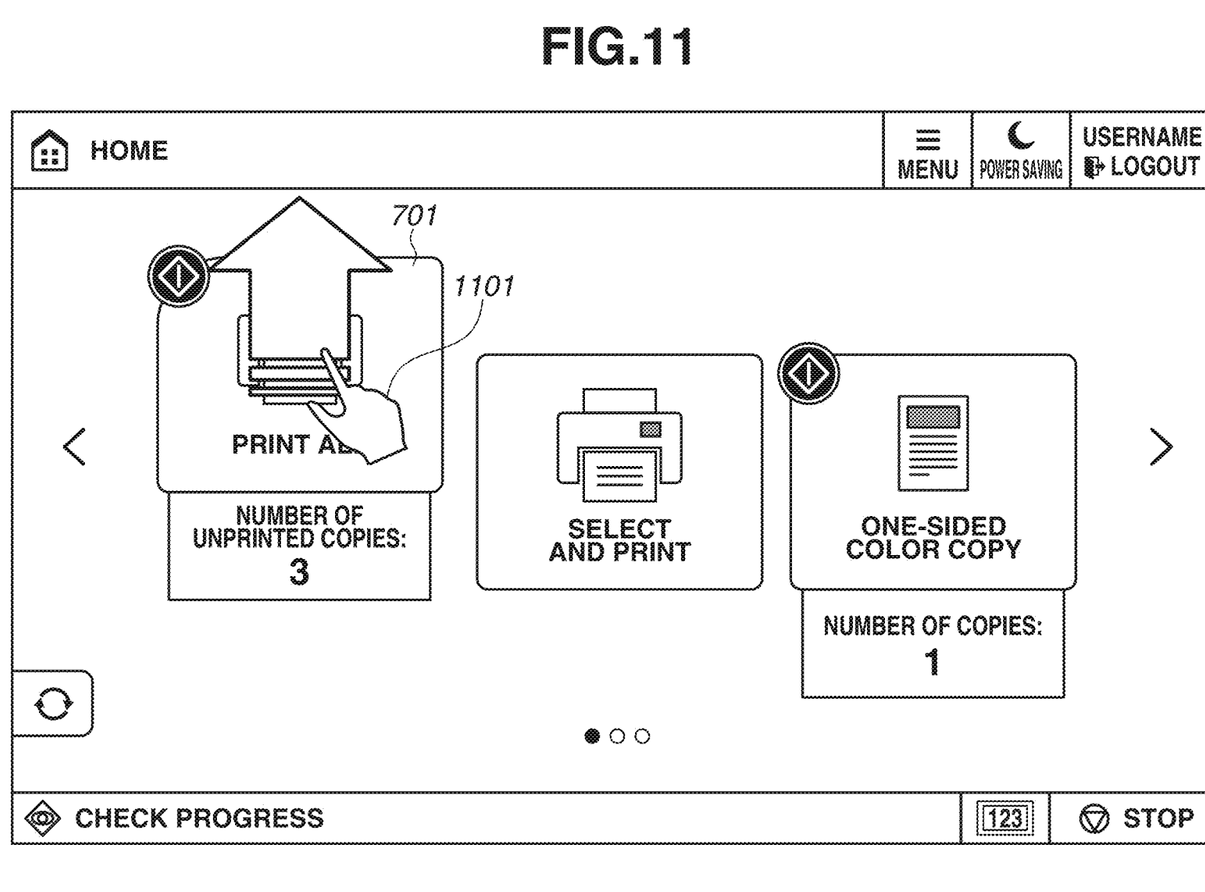
FIG. 11 is a diagram illustrating a method for controlling a home screen according to a third exemplary embodiment of the present disclosure.

FIG. 11 is a diagram illustrating the method for deleting all the print jobs associated with the login user. In the description of the present exemplary embodiment, a touch panel shall be used as the display unit 120.

A user 1101 logs in to the image processing apparatus 1, and then flicks the print all button 701 displayed on the home screen upward (in the direction of the white arrow in FIG. 11). The print all button 701 is thereby deleted from the home screen, and the print jobs to be executed by pressing the print all button 701 are deleted from the image processing apparatus 1 as well. Since the print jobs have been deleted, the home screen after the deletion of the print all button 701 enters the state of FIG. 6. While an example has been described where the print jobs are deleted by a flick, the deletion method is not limited thereto. For example, the print all button 701 may be deleted by a double tap or long tap.

Alternatively, a button deletion space may be prepared in the home screen, and the print all button 701 may be deleted by dragging and dropping the print all button 701 to the button deletion space.

Figure 12:
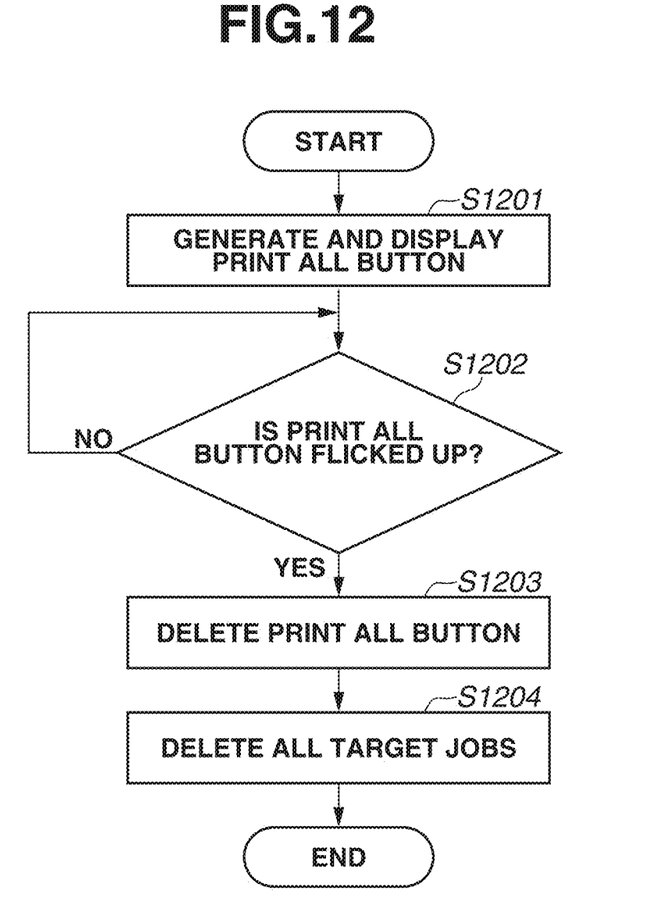
FIG. 12 is a flowchart illustrating a control method related to display of the home screen according to the third exemplary embodiment of the present disclosure.

FIG. 12 is a flowchart illustrating a control method related to the display of the home screen according to the third exemplary embodiment. The processing illustrated in FIG. 12 is implemented by the CPU 100 executing a program read from the ROM 104.

In step S1201, the operation processing unit 204 initially generates a print all button 701 and displays the print all button 701 on the home screen based on a login condition. In step S1202, the operation processing unit 204 detects whether the print all button 701 on the home screen is flicked up. If the print all button 701 is detected to be flicked upward (YES in step S1202), the processing proceeds to step S1203. In step S1203, the operation processing unit 204 deletes the print all button 701. After the print all button 701 is deleted, then in step S1204, the operation processing unit 204 deletes all the target jobs of the print all button 701 from the image processing apparatus 1, i.e., from the job information management table 1300.

According to the third exemplary embodiment, all the print jobs stored in the image processing apparatus 1 and associated with the user can be deleted without trouble. In other words, if there is a plurality of print jobs to be deleted, the user can delete all the print jobs without the trouble of selecting the plurality of target jobs.

As describe above, according to exemplary embodiments of the present disclosure, a button allowing execution of all reserved print jobs is displayed on an operation panel of an image processing apparatus. This enables confirmation of the user's intention before executing all the reserved print jobs without troubling the user.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-171677, filed Sep. 20, 2019, which is hereby incorporated by reference herein in its entirety.

What is claimed is:

1. An image processing apparatus configured to display an operation screen, the image processing apparatus comprising:
at least one processor and at least a memory coupled to the at least one processor and having instructions stored thereon, and when the instructions are executed by the at least one processor, the at least one processor acting as:
an authentication unit configured to authenticate a user of the image processing apparatus;
a determination unit configured to determine whether there is a print job associated with the user authenticated by the authentication unit; and
a display control unit configured to control display of a first display object for giving an instruction for execution of one or more print jobs associated with the user on the operation screen displayed after the user is authenticated by the authentication unit, based on a result of the determination by the determination unit, wherein the first display object displays a number of print jobs associated with the user.

2. The image processing apparatus according to claim 1, wherein, in a case where the determination unit determines that there is a print job associated with the user authenticated by the authentication unit, the display control unit is configured to display the first display object on the operation screen.

3. The image processing apparatus according to claim 1, wherein, in a case where the determination unit determines that there is no print job associated with the user authenticated by the authentication unit, the display control unit is configured not to display the first display object on the operation screen.

4. The image processing apparatus according to claim 1, wherein if the first display object is pressed, the one or more print jobs associated with the user authenticated by the authentication unit is executed.

5. The image processing apparatus according to claim 1, wherein if the first display object is pressed, the operation screen transitions to a screen where the one or more print jobs associated with the user authenticated by the authentication unit is selected as jobs to be printed.

6. The image processing apparatus according to claim 1, wherein the display control unit is configured to display the first display object at a top of the operation screen.

7. The image processing apparatus according to claim 1, wherein the number of print jobs displayed on the first display object is changed based on execution of a print job associated with the user authenticated by the authentication unit.

8. The image processing apparatus according to claim 1, the at least one processor further acting as a management unit configured to manage a print job and a user having transmitted the print job in association with each other.

9. The image processing apparatus according to claim 1, wherein the display control unit is configured to display the first display object on a screen displayed after the user is authenticated by the authentication unit.

10. The image processing apparatus according to claim 1, wherein the display control unit is further configured to display a second display object for displaying a list of print jobs associated with the user authenticated by the authentication unit on the operation screen.

11. The image processing apparatus according to claim 10, wherein the second display object is displayed next to the first display object.

12. The image processing apparatus according to claim 10, wherein if the second display object is pressed, the operation screen transitions to a screen for accepting an instruction for selecting a print job to be printed from the list of print jobs associated with the user authenticated by the authentication unit.

13. The image processing apparatus according to claim 1, wherein if a predetermined operation is made on the first display object, the first display object is deleted from the operation screen.

14. The image processing apparatus according to claim 13, wherein the predetermined operation is any one of a flick, double tap, long tap, and drag and drop.

15. The image processing apparatus according to claim 1, wherein if a predetermined operation is made on the first display object, a print job corresponding to the first display object is deleted from the image processing apparatus.

16. The image processing apparatus according to claim 1, wherein the operation screen is a home screen for selecting functions to be executed from a plurality of functions including a copy function and a scan function.

17. An information processing method performed by an image processing apparatus configured to display an operation screen, the information processing method comprising:
   authenticating a user of the image processing apparatus;
   determining whether there is a print job associated with the authenticated user; and
   controlling display of a first display object for giving an instruction for execution of one or more print jobs associated with the user on an operation screen displayed after the user is authenticated, based on a result of the determining, wherein the first display object displays a number of print jobs associated with the user.

* * * * *